(12) United States Patent
Bordier et al.

(10) Patent No.: US 12,165,435 B2
(45) Date of Patent: Dec. 10, 2024

(54) IDENTITY VERIFICATION IN A DOCUMENT MANAGEMENT SYSTEM

(71) Applicant: DocuSign, Inc., San Francisco, CA (US)

(72) Inventors: Renaud Louis Bordier, La Ferrière en Parthenay (FR); John James Kostovski, Paris (FR); Emmanuel Montacutelli, Paris (FR); Thibault de Valroger, Paris (FR); Erwann Abalea, Ile-de-France (FR)

(73) Assignee: DocuSign, Inc., San Francisco, CA (US)

( * ) Notice: Subject to any disclaimer, the term of this patent is extended or adjusted under 35 U.S.C. 154(b) by 300 days.

(21) Appl. No.: 17/246,447

(22) Filed: Apr. 30, 2021

(65) Prior Publication Data

US 2022/0350984 A1 Nov. 3, 2022

(51) Int. Cl.
| | | |
|---|---|---|
| *G06V 40/30* | (2022.01) | |
| *G06F 21/31* | (2013.01) | |
| *G06F 21/64* | (2013.01) | |
| *G06V 30/40* | (2022.01) | |
| *H04L 9/32* | (2006.01) | |

(52) U.S. Cl.
CPC ............ *G06V 40/394* (2022.01); *G06F 21/31* (2013.01); *G06F 21/64* (2013.01); *G06V 30/40* (2022.01); *G06V 40/382* (2022.01); *H04L 9/3247* (2013.01)

(58) Field of Classification Search
CPC .... G06V 40/394; G06V 30/40; G06V 40/382; G06F 21/31; G06F 21/64; H04L 9/3247
See application file for complete search history.

(56) References Cited

U.S. PATENT DOCUMENTS

| | | | |
|---|---|---|---|
| 10,726,488 B2* | 7/2020 | Schoos | G06Q 40/08 |
| 10,853,033 B1* | 12/2020 | Meyles | G06F 7/14 |
| 10,896,060 B1* | 1/2021 | Sciarrino | G06F 9/48 |
| 11,176,180 B1* | 11/2021 | Gudur | G06F 16/3344 |
| 11,386,394 B2* | 7/2022 | Safa | G06F 16/93 |
| 2010/0011428 A1* | 1/2010 | Atwood | H04L 63/08 709/227 |
| 2012/0016663 A1* | 1/2012 | Gillam | G06F 16/33 704/9 |

(Continued)

*Primary Examiner* — Helen Zong
(74) *Attorney, Agent, or Firm* — Shumaker & Sieffert, P.A.

(57) ABSTRACT

A document management system performs name matching operations to validate an identity claimed by a recipient of a document. To validate a claimed identity the document management system compares name data obtained from an identity data source with name data corresponding to a recipient entity of a document to determine whether name features of the identity source name data match recipient name data. The name matching operations may include applying a set of name matching rules to the identity source name data and the recipient name data to determine whether features that differ between the identity source name data and the recipient name data are acceptable alternative representations. Responsive to successfully validating the identity, the system may authorize the recipient to perform actions on the document. Identity source name data may be received from a variety of identity data sources, such as an identity document or a trusted service provider.

13 Claims, 10 Drawing Sheets

(56) References Cited

U.S. PATENT DOCUMENTS

| | | | |
|---|---|---|---|
| 2014/0244234 A1* | 8/2014 | Huang | G06F 40/44 |
| | | | 704/2 |
| 2015/0181405 A1* | 6/2015 | Dua | H04W 8/005 |
| | | | 455/456.3 |
| 2017/0024697 A1* | 1/2017 | Baessler | G06Q 10/107 |
| 2018/0181964 A1* | 6/2018 | Zagarese | G06Q 20/40145 |
| 2019/0294594 A1* | 9/2019 | Weghorst | G06F 16/215 |
| 2019/0303371 A1* | 10/2019 | Rowe | G06F 16/24564 |
| 2021/0026974 A1* | 1/2021 | Kurian | G06F 21/604 |
| 2021/0224419 A1* | 7/2021 | Mcbride | G06Q 10/06314 |
| 2021/0320799 A1* | 10/2021 | Bankston | H04L 9/3242 |
| 2022/0353092 A1* | 11/2022 | Rivera | H04L 9/30 |

\* cited by examiner

Special Character Name Matching Rules
340

Matching Recipient Name Data 346

FRANK J. KURTZ

FRANK J KURTZ

Non-Matching Recipient Name Data 348

FRANK JEFFREY

Identity Document Name Data 344

Identity Document 342

OREGON  DRIVER LICENSE

DL G555555
EXP 01/01/2022   CLASS C
LN KURTZ        END   NONE
FN FRANK□J
DOB 04/22//1992
RSTR NONE
SEX M   HAIR BLK  EYES GRN
HGT 6' - 01"WGT 185 lb ISS
                         01/01/2019

Providing Agreement to Client Device for Execution by Client Device
410

↓

Receiving Recipient Name Data Representing Identity Claimed by User of Client Device Having First Name Feature
420

↓

Obtaining Information Describing Identity Document Corresponding To User Including Identity Source Name Data Having Second Name Feature Differing from First Name Feature
430

↓

Performing Name Matching Operation on First and Second Name Feature to Determine Whether First Name Feature and Second Name Feature Correspond to Same Name
440

↓

Responsive to Determining First Name Feature and Second Name Feature Correspond to Same Name, Verfiying Identity of User and Authorizing User to Execute Agreeement
450

FIG. 4

IDENTITY VERIFICATION IN A DOCUMENT MANAGEMENT SYSTEM

BACKGROUND

This disclosure relates generally to electronic document management, and more specifically to verifying entity identities for interacting with documents in a document management system.

Document management systems manage electronic documents for various entities (e.g., people, companies, organizations). Such electronic documents may include various types of agreements that can be executed (e.g., electronically signed) by entities, such as non-disclosure agreements, indemnity agreements, purchase orders, lease agreements, employment contracts, etc. Document management systems may employ techniques to verify an identity of an entity before allowing the entity to interact with a document, such as to execute an agreement. For example, conventional document management systems may receive trusted identity information from a user attempting to interact with a document and use the trusted identity information to verify an identity claimed by the user. For example, identity information may be extracted from a government issued form of identification, such as a driver license or passport.

However, conventional systems fail to accurately validate user identities in cases where identity information differs from an expected result (e.g., a claimed identity). For example, conventional systems fail to recognize alternative representations of the same name. Due to these failings, conventional systems prevent users that are accurately claiming an identity from interacting with documents or taking other actions. As such, improved techniques for verifying user identities for interacting documents are needed.

SUMMARY

A document management system performs name matching operations to validate an identity claimed by a recipient of a document. In particular, the document management compares name data obtained from an identity data source with name data corresponding to a recipient entity of a document (e.g., an individual person, organization, or company) to determine whether name features of the identity source name data and recipient name data match. The name matching operations performed by the document management system may include applying a set of name matching rules to the identity source name data and the recipient name data to determine whether features that differ between the identity source name data and the recipient name data are acceptable alternative representations. For instance, name data may have differing letter cases (e.g., capital or lowercase letters), differing use of diacritics (e.g., e vs é), differing use of transliterations (e.g., Juergen vs Jürgen), differing use of first, middle, or last names), or other differences that may be acceptable alternatives according to the set of name matching rules. Identity source name data may be received from a variety of identity data sources, such as being extracted from an identity document of a user or received from a trusted service provider or other suitable provider of identity information.

If the document management system successfully verifies an identity claimed by the recipient entity by performing the name matching operations, the document management system may authorize the recipient entity to perform one or more actions relevant to a received document, such as executing an agreement represented by the document (e.g., electronically signing the document). Alternatively, if the document management system does not successfully verify the identity claimed by the recipient entity, the document management system may prevent the recipient entity from performing actions relevant to the received document.

BRIEF DESCRIPTION OF THE DRAWINGS

FIG. 3E depicts an example application of special character name matching rules to name type features of identity document name data, according to one embodiment.

FIG. 4 is a flowchart illustrating a process for validating an identity of a recipient entity using name matching rules, according to one embodiment.

Figure 1:
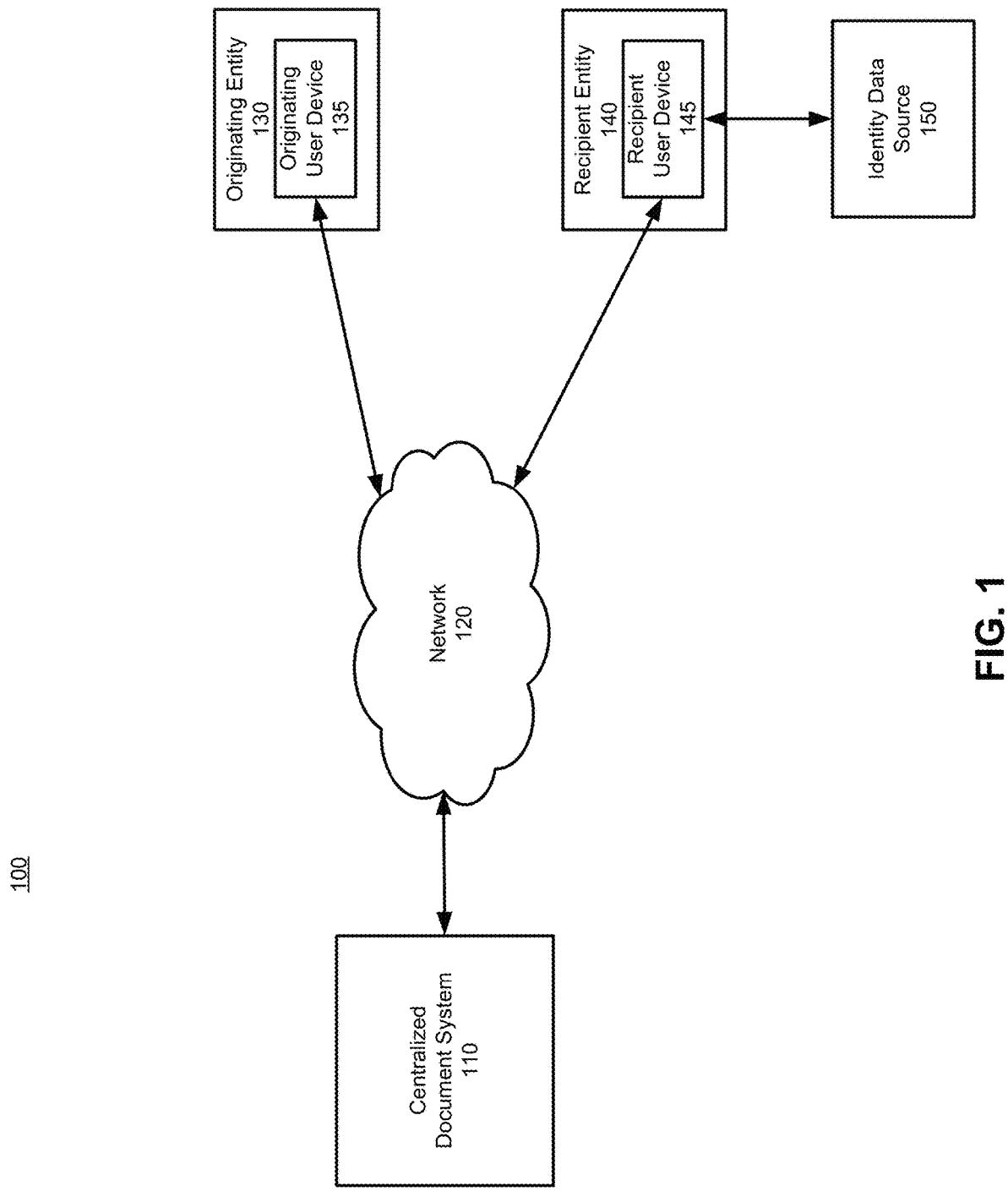
FIG. 1 is a block diagram of a system environment in which a centralized document system operates, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables an originating entity to create and send documents to one or more recipient entities for negotiation, collaborative editing, electronic execution (e.g., electronic signature), automation of contract fulfilment, archival, and analysis, among other tasks. Within the system environment, a recipient entity may review content or terms presented in a digital document, and in response to agreeing to the content or terms, can electronically execute the document. In some embodiments, in advance of the execution of the documents, the originating entity may generate a document package to provide to the one or more recipient entities. The document package includes at least one document to be executed by one or more recipient entities. In some embodiments, the document package may also include one or more permissions defining actions the one or more recipient entities can perform in association with the document package. In some embodiments, the document package may also identify tasks the one or more recipient entities are to perform in association with the document package. In some embodiments, the document package may include name matching rules for verifying an identity of an entity claiming to be one of the one or more recipient entities for a document, such as name matching rules configured by the originating entity.

The system environment described herein can be implemented within a centralized document system, an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform. It should also be noted that "centralized document system", "document management system", and other similar terminology are used interchangeably herein.

The processes described herein, in some implementations, provide a means for the one or more recipient entities to verify their identity to perform one or more actions in relation to a document package, such as executing an agreement, accessing a document, modifying a document, or any other suitable action. In particular, the centralized document system facilitates a name matching process wherein name data received from an identity data source (identity source name data) is compared to name data corresponding to a recipient entity (recipient name data). As an example, recipient name data may be included in a document package. The name matching process includes one or more name matching operations whereby features of the identity source name data and recipient name data are compared. A name matching operation may be performed by applying one or more name matching rules of a set of name matching rules to relevant name features. In this case, the name matching rules describe constraints for determining whether a name feature of the recipient name data is an allowed alternative representation of a name feature of the identity source name data, or vice versa. Particular examples of name matching rules are described in detail below with reference to FIGS. 3A-G.

FIG. 1 is a block diagram of a system environment in which a centralized document system operates, according to one embodiment. The system environment 100 shown by FIG. 1 comprises a centralized document system 110, a network 120, an originating entity 130 associated with an originating user device 135, a recipient entity 140 associated with a recipient user device 145. In alternative configurations, different or additional components may be included in the system environment 100.

The centralized document system 110 is a computer system (or group of computer systems) for storing and managing documents or document packages (e.g., envelopes) for various entities. Using the centralized document system 110, entities can collaborate to create, edit, review, negotiate, and execute documents. During execution of one or more documents, the centralized document system 110 provides a means for generating and modifying a document package (also referred to as a document envelope). The document package may include at least one document for execution. The centralized document system 110 may provide the at least one document (e.g., a contract, agreement, purchase order, or other suitable document) in which terms have been agreed upon by two or more entities (e.g., by two or more individual users or organizations) to a recipient entity 140 for execution, as described above. The centralized document system 110 may generate the document package per a request from an originating entity 130. In some implementations, the document package may additionally include a set of document permissions. The centralized document system 110 may provide a means for the recipient entity 140 to request to assign the set of document permissions to a second recipient entity (e.g., within a same or different organization). In other implementation, the centralized document system 110 may scan the document package (including the document) to determine whether the document package includes a document of a particular type, and if so, may provide the document package to additional recipient entities not originally specified to receive the document package. In other implementations, the centralized document system 110 modifies the document package to be sent to a substitute recipient entity based on the original recipient entity being unavailable.

The centralized document system 110 can be a server, server group or cluster (including remote servers), or another suitable computing device or system of devices. In some implementations, the centralized document system 110 can communicate with user devices (e.g., the originating user device 135 or the recipient user device 145) over the network 120 to receive instructions and send document packages (or other information) for viewing on user devices. The centralized document system 110 will be discussed in further detail with respect to FIG. 2.

The network 120 transmits data within the system environment 100. The network 120 may comprise any combination of local area or wide area networks, using both wired or wireless communication systems, such as the Internet. In some embodiments, the network 120 transmits data over a single connection (e.g., a data component of a cellular signal, or Wi-Fi, among others), or over multiple connections. In some embodiments, the network 120 uses standard communications technologies or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML).

In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the centralized document system 110 can communicate with user devices associated with entities (e.g., the originating user device 135 or the recipient user device 145). An entity can represent an individual user, group, organization, or company that is able to interact with document packages (or other content) generated on or managed by the centralized document system 110. Each entity can be associated with a username, email address, full or partial legal name, or other identifier that can be used by the centralized document system 110 to identify the entity and to control the ability of the entity to view, modify, execute, or otherwise interact with document packages managed by the centralized document system 110. In some implementations, entities can interact with the centralized document system 110 through a user account with the centralized document system 110 and one or more user devices accessible to that user entity.

In the embodiment of FIG. 1, an originating entity 130 creates the document package via the centralized document system 110. The document package is sent by the centralized document system 110 for review and execution by the recipient entity 140. As described in greater detail below with reference to FIG. 2, the recipient entity 140 may be associated with recipient name data representing an identity of an individual corresponding to the recipient entity. For instance, the individual may be s a user having a user account with the centralized document system 110.

The originating user device 135 and the recipient user device 145 are computing devices capable of receiving user input as well as transmitting to, or receiving data from, the centralized document system 110 via the network 120. For example, the user devices 135 or 145 can be a desktop or a laptop computer, a smartphone, tablet, or another suitable device. The user devices 135 or 145 are configured to communicate via the network 120 (for example, with the centralized document system 110). In one embodiment, the user device 135 or 145 executes an application allowing a user of the user device to interact with the centralized document system 110. For example, the user devices 135 or 145 can execute a browser application to enable interaction between the user device and the centralized document system 110 via the network 120. In some embodiments, a single entity can be associated with multiple user devices, or one user device can be shared between multiple entities who may, for example, log into a personal account on the user device to access the centralized document system 110.

The identity data source 150 is a trusted source of name data that can be used to verify an identity of the recipient entity 140 (e.g., a user) to execute a received document. In an exemplary embodiment, the identity data source 150 is an identity document for an individual user of the recipient user device 145, such as a driver's license, a passport, or other form of government issued identification. In this case, the recipient entity 140 may obtain an image of the identity document to provide to the centralized document system 110, such as by using a camera component of the recipient user device 145 to capture the image. The recipient user device 145, the centralized document system 110, or a third-party system may process the image of the identity document to extract identity source name data. In the same or different embodiments, the identity data source 150 may be a trusted service provider storing identity information for the recipient entity 140, such as a private or governmental database storing identity information corresponding to one or more individuals. In this case, the recipient device 145 may obtain identity source name data from the trusted service provider for providing to the centralized document system 110 or authorize the trusted service provider to provide identity source name data directly to the centralized document system 110. Although the identity data source 150 is connected to the recipient user device 145 in the embodiment of FIG. 1, this is done for the purpose of illustration only, and in various embodiments the identity data source 150 may be accessed by, or communicate with, any components of the system environment 100.

Example Centralized Document System Architecture

Figure 2:
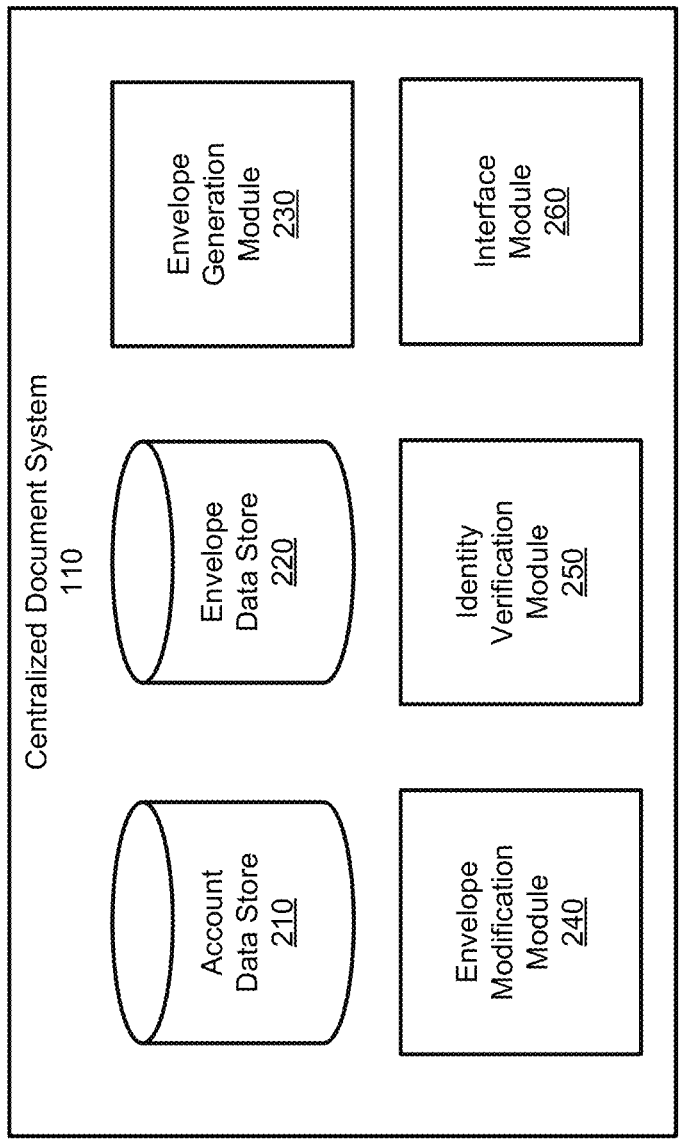
FIG. 2 is a block diagram of a centralized document system, according to one embodiment.

FIG. 2 is a block diagram of a centralized document system 110, according to one embodiment. Components of the centralized document system 110 may be a combination of hardware and software. In the embodiment shown in FIG. 2, the centralized document system 110 includes an account data store 210, an envelope data store 220, an envelope generation module 230, an envelope modification module 240, an identity verification module 250, and an interface module 260. In other embodiments, the centralized document system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the centralized document system 110 may be distributed among the components in a different manner than described.

The account data store 210 is a file storage system, database, set of databases, or other data storage system storing information associated with accounts of the centralized document system 110. Entities may be associated with one or more accounts with the centralized document system 110. In some embodiments, a parent entity may be associated with a parent account (e.g., an organization) and a set of child entities of the parent entity (e.g., employees of an organization) may be associated with a user account. For example, the originating entity 130 or the recipient entity 140 may have corresponding parent accounts or user accounts with the centralized document system 110. The parent account or user accounts may be associated with a policy or an organization chart for an entity. A policy for an entity is a system of principles that guide certain processes or workflows for the entity. For example, a policy may dictate which recipient entities are to receive document packages and a set of tasks the recipient entities are to perform in relation to the document package or a set of permissions the recipient entities may be subject to in relation to the document package. In some embodiments, the policy specifies a set of name matching rules to be used to verify the identities of recipient entities (e.g., in order to execute agreements), as described in greater detail below with reference to the identity verification module 250. In some embodiments, the policy specify criteria that must be satisfied for an entity to be authorized to access or modify the document package, such as threshold number or percentage of name matching rules that must be satisfied to verify the identity of a recipient entity. In some embodiments, the policy specifies acting entities and corresponding sets of tasks for the acting entities to perform in relation to the document package based on document types or types of document content of the one or more documents included in the document package. In some embodiments, the policy specifies one or more thresholds corresponding to one or more types of document content (e.g., a payment amount, a payment term, etc.). For example, a policy may specify a threshold payment amount and corresponding acting entities and sets of tasks for the acting entities to perform if a payment amount within a document package exceeds the threshold payment amount. The org chart may include a list of entities (e.g., including names, titles, roles, departments, direct reports, supervisors, teams, groups, etc.) within an organization.

Each user account associated with an entity may include information about the entity, such as information about the individual with access to the user account, age of the account, frequency of account use, log of past account transactions, and the like. Information about the individual with access to the account may include name data representing the individual's name (e.g., first name, last name, middle name, suffixes, nicknames, etc.), email address, organization name, title, role, department, and the like. The individual's title is a position title or job title held by the individual with an organization. The individual's role is a function that the individual fulfills within their organization. For example, a title may be "General Counsel" and a role may be reviewing and executing agreements. The individual's department is a group within the organization where the individual works. For example, a department may be operations, finance, sales, human resources, purchases, legal, and the like.

The envelope data store 220 is a file storage system, database, set of databases, or other data storage system storing information associated with document envelopes. Originating entities (e.g., the originating entity 130) provide one or more documents to recipient entities (e.g., the recipient entity 140) via envelopes. A document envelope (also referred to as a document package herein) can include at least one document for execution. The at least one document may have been previously negotiated by an originating entity and a recipient entity. And, as such, the document may be ready for execution upon the creation of an envelope. The document package may also include recipient information and document fields indicating which fields of the document need to be completed for execution (e.g., where the recipient entity 140 should sign, date, or initial the document). The recipient information may include contact information for a recipient entity (e.g., a name and email address).

In some embodiments, the document package may also include a set of permissions. The set of permissions may be assigned by an originating entity 130. The set of permissions included in the document package define one or more actions that a recipient entity can perform with regard to the document package. The one or more actions may include adding one or more additional recipient entities to the document package, removing one or more recipient entities from the document package, updating an order in which two or more recipient entities receive the document package, updating one or more tasks of one or more recipient entities of the document package, adding one or more additional documents to the document package, removing one or more documents from the document package, providing a notification (e.g., "Documents within document package need careful review") to one or more recipient entities about the document package, and the like. For example, the originating entity 130 may set the following permissions for a document package: allow recipient entity 140 to add additional recipient entities, allow recipient entity 140 to remove one or more documents from the document package, allow recipient entity 140 to execute one or more documents, allow recipient entity 140 to modify one or more documents, and the like.

In some embodiments, the document package may also identify a first set of acting entities, and for each acting entity, the document package may also identify a first set of tasks that the acting entity is to perform with regard to the document package. The first set of tasks may define what each acting entity is to do and complete before the at least one document of the document package can be executed. The set of tasks may include reviewing the at least one document, initialing the at least one document, signing the at least one document, providing information for the at least one document, and the like.

The envelope generation module 230 may generate envelopes for an originating entity to send to a recipient entity. For example, the envelope generation module 230 may generate an envelope for the originating entity 130 to send to the recipient entity 140. In a specific implementation, the envelope generation module 230 may receive instructions from the originating entity 130 to generate an envelope (also referred to as a document package) that will be sent to one or more recipient entities. The envelope generation module 230 may generate a document package that includes at least one document for execution (e.g., an agreement). In an implementation, the envelope generation module 230 may generate a document package that may also include a set of permissions corresponding to each document of the document package. In another implementation, the envelope generation module 230 may generate a document package that identifies a first set of acting entities and for each acting entity a first set of tasks that each acting entity of the first set of acting entities is to perform with regards to the document package (for instance before the documents of the document package can be executed).

In some embodiments, the envelope generation module 230 may provide the document package to one or more recipient entities after the document package has been generated per a request from an originating entity. In alternative embodiments, the envelope generation module 230 may provide the document package to one or more recipient entities after the document package has been modified by the envelope modification module 240.

The envelope modification module 240 manages modifications made to a document package. In some embodiments, the modifications are requested by a recipient entity (e.g., a user of the recipient user device 145) and provided to an originating entity for approval (e.g., by a user of the originating user device 135). In some embodiments, the modifications are automatically applied by the envelope modification module 240 after being requested by a user (such as the recipient entity 140). Modifications to a document package may include a variety of actions, such as executing a document (e.g., via electronic signature) or changing document permissions for the document package (e.g., assigning document permissions to an additional recipient entity). The envelope modification module 240 may authorize a recipient entities to access or modify document packages before performing modifications or other actions requested by the recipient entity. In particular, the envelope modification module 240 may verify an identity of a recipient entity before allowing the recipient entity to make modifications or perform other actions on a document package. For instance, by communicating with the identity verification module 250, as described in greater detail below.

In some embodiments, the envelope modification module 240 applies one or more policies described by a document package to authorize a recipient entity to make modifications or perform other actions on the document package. For instance, the envelope modification module 240 may apply one of the policies described above with relation to the account data store 210. The envelope modification module 240 may apply multiple policies for authorizing a recipient entity to modify a document package, where some or all of the policies may need to be successfully satisfied in order for a recipient entity to e authorized. In this case, the envelope modification module 240 may use various processes or criteria to evaluate the results of applying the multiple policies, such as by weighting the policies by relative priority or determining whether the satisfied policies meet a threshold criteria (e.g., a number of type of satisfied policies).

The identity verification module 250 verifies identities of recipient entities of document packages, e.g., for authorizing the recipient entities to modify the document packages. In particular, the identity verification module 250 receives identity source name data from an identity data source (e.g., the identity data source 150) and compares the identity source name data to recipient name data corresponding to the recipient entity (e.g., name data included in the document package) by performing one or more name matching operations on name features of the identity source name data and the recipient name data. In embodiments, the one or more name matching operations include applying a set of name matching rules to the name features. As described above, the name matching rules describe constraints for determining whether a name feature of the recipient name data is an allowed alternative representation of a name feature of the identity source name data, or vice versa. The name matching rules may be included in the document package or otherwise configured by an originating entity for the document package. The name matching rules may include rules relating to different types of name features, such as letter cases, diacritics, transliterations, name types (e.g., first, middle, last), special characters (e.g., initials), suffixes, etc. Applying name matching rules relating to various types of name features are described in greater detail below with reference to FIGS. 3A-F.

In some embodiments the identity verification module 250 may initially compare the identity source name data to the recipient name data to determine whether they are an exact match or have one or more differing name features. In the case of an exact match, the identity verification module 250 may verify the identity of the recipient entity. In the case of differing name features, the identity verification module 250 may apply the name matching rules to determine whether the identity source name data and the recipient name data match despite the one or more differing name features, such as due to the one or more differing name features being acceptable equivalent representations based on the name matching rules. If the identity verification module 250 determines the identity source and recipient name data match based on the initial comparison or by applying the name matching rules, the identity verification module 250 may verify the identity of the recipient entity. Alternatively, if the identity verification module 250 determines the identity source and recipient name data do not match based on the initial comparison or by applying the name matching rules, the identity verification module 250 rejects the identity verification attempt. In this case, the centralized document system 110 may not authorize the recipient entity to perform one or more actions on a relevant document package, such as executing an agreement.

In some embodiments, the identity verification module 250 prompts a recipient entity to provide identity source name data for confirming the recipient entity's identity. In particular, the identity verification module 250 or the interface module 260 may provide an interface to a recipient user device (e.g., the recipient user device 145) describing one or more options for a user of the recipient user device to provide identity source name data. The options for providing identity source name data may include providing an image of an identity document or requesting identity source name data from a trusted service provider, as described above with reference to the identity data source 150. If an image of an identity document is used as an identity data source, the identity verification module 250 may process the image to extract identity source name data. For example, the identity verification module 250 may apply a trained machine learning model to the image to extract the identity source name data. The model may be trained by the centralized document system 110 or may be trained or otherwise provided by a third-party system (e.g., a third-party image processing service).

The interface module 260 may generate user interfaces allowing entities to interact with document packages managed by the centralized document system 110. For example, the interface module 260 may generate a user interface for an originating entity 130 to generate a document package. In another example, the interface module 260 may generate a user interface for a recipient entity 140 to view a document package. In some implementations, the interface module 260 may provide a user interface enabling a recipient entity 140 to modify a document package. For example, the interface module 260 may display a listing of the one or more recipient entities 140 of the document package to a recipient entity 140 on an electronic display of a user device 145. The interface module 260 may provide one or more interface elements (e.g., links, buttons, checkboxes, etc.) on the electronic display for the recipient entity 140 to select in order to request to assign a set of document permissions to an additional recipient entity 140. In some implementations, the interface module 260 may generate a user interface for displaying a notification to a recipient entity 140 that an additional recipient entity 140 cannot be assigned the set of document permissions.

Example Name Matching Rules

FIGS. 3A-F depict example applications of name matching rules corresponding to different types of name features of identity source name data included in identity documents. The examples depicted in FIGS. 3A-F are provided for the purpose of illustration only, and other types of identity documents or name features may be used by the centralized document to verify an identity of recipient entities. For instance, other types of identity documents than driver licenses may be used. The identity source name data included in the identity documents depicted in FIGS. 3A-F may be extracted from an image of the identity document 302, as described above with reference to the identity data source 150 and the identity verification module 250. Similarly, the examples of matching and non-matching recipient name data depicted in FIGS. 3A-F may be included in a document package received by a recipient entity or otherwise associated with a recipient entity. Note that although the matching recipient name data depicted in FIGS. 3A-F does not include names that exactly match the identity document name data, this is done in order to illustrate sets of name data that match despite having differing name features. One skilled in the art will appreciate that recipient name data and identity document name data that do not have any differing name features can also be considered to match.

Figure 3A:
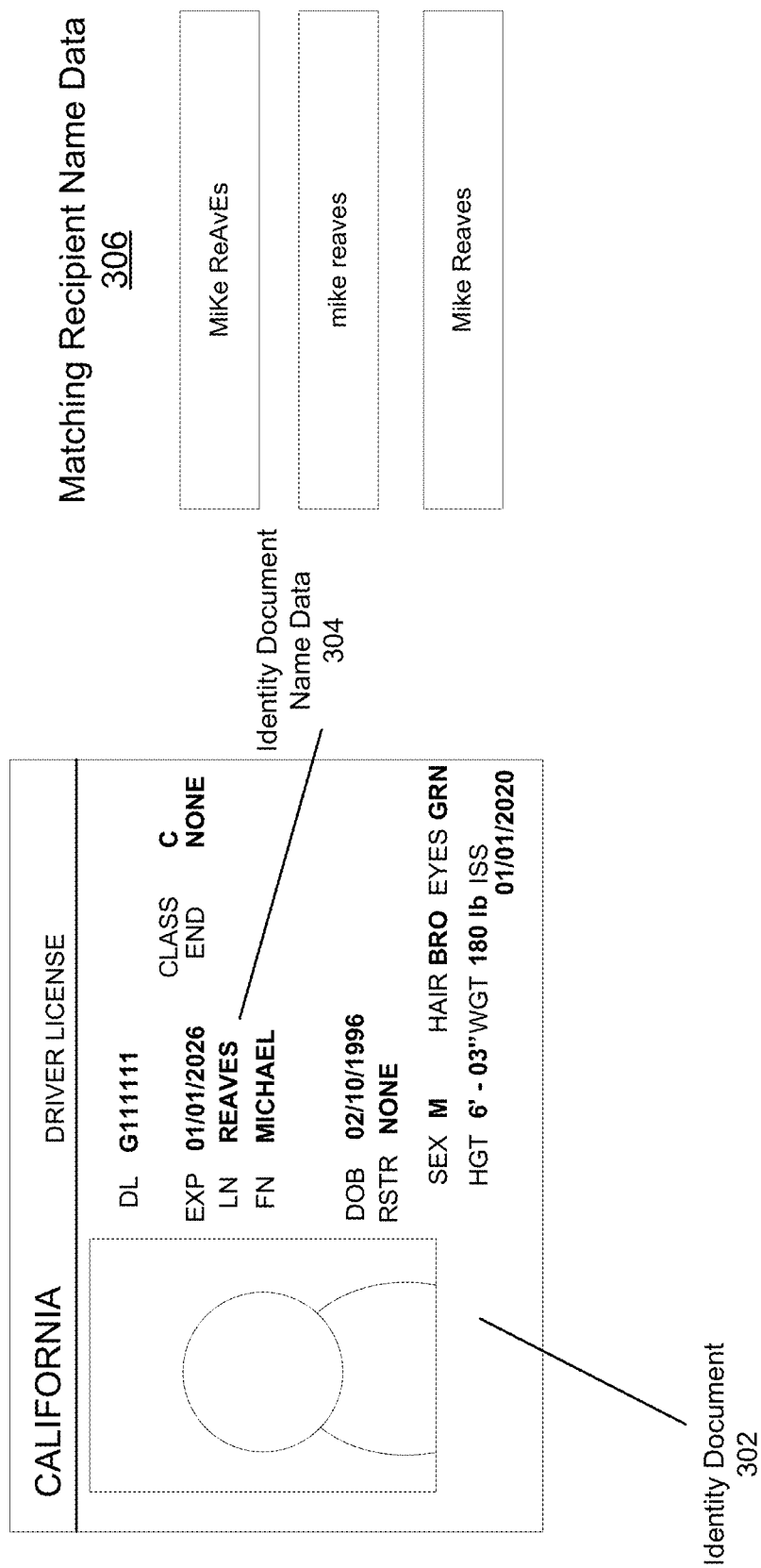
FIG. 3A depicts an example application of case sensitivity name matching rules to letter case name features of identity document name data, according to one embodiment.

FIG. 3A depicts an example application of case sensitivity name matching rules 300 to letter case name features of identity document name data 304. The case sensitivity name matching rules 300 describe constraints relating to how letter case should or should not be considered for determining if identity source and recipient name data match. The case sensitivity name matching rules 300 may include various specific rules that result in identity document name data matching or not matching recipient name data.

In the example shown in FIG. 3A, the case sensitivity name matching rules 300 include a rule to "ignore case sensitivity" in comparing identity document name data to recipient name data. For instance, according to the "ignore case sensitivity rule" both "M" and "m" are equivalent. As such, applying the "ignore case sensitivity" rule results in the name represented by the identity document name data 304 matching each name represented by matching recipient name data 306. In particular, the identity document name data 304 is included in an identity document 302 and includes a first name "MICHAEL" and a last name "REAVES," both of which are represented using all capital letters. The matching recipient name data 306 includes names represented with different letter case name features than the identity document name data 304 but which still match the identity document name data 306 based on the case sensitivity name matching rules 300. In other cases, the case sensitivity name matching rules may include additional or alternative rules, such as ignoring case sensitivity for a subset of letters.

Figure 3B:
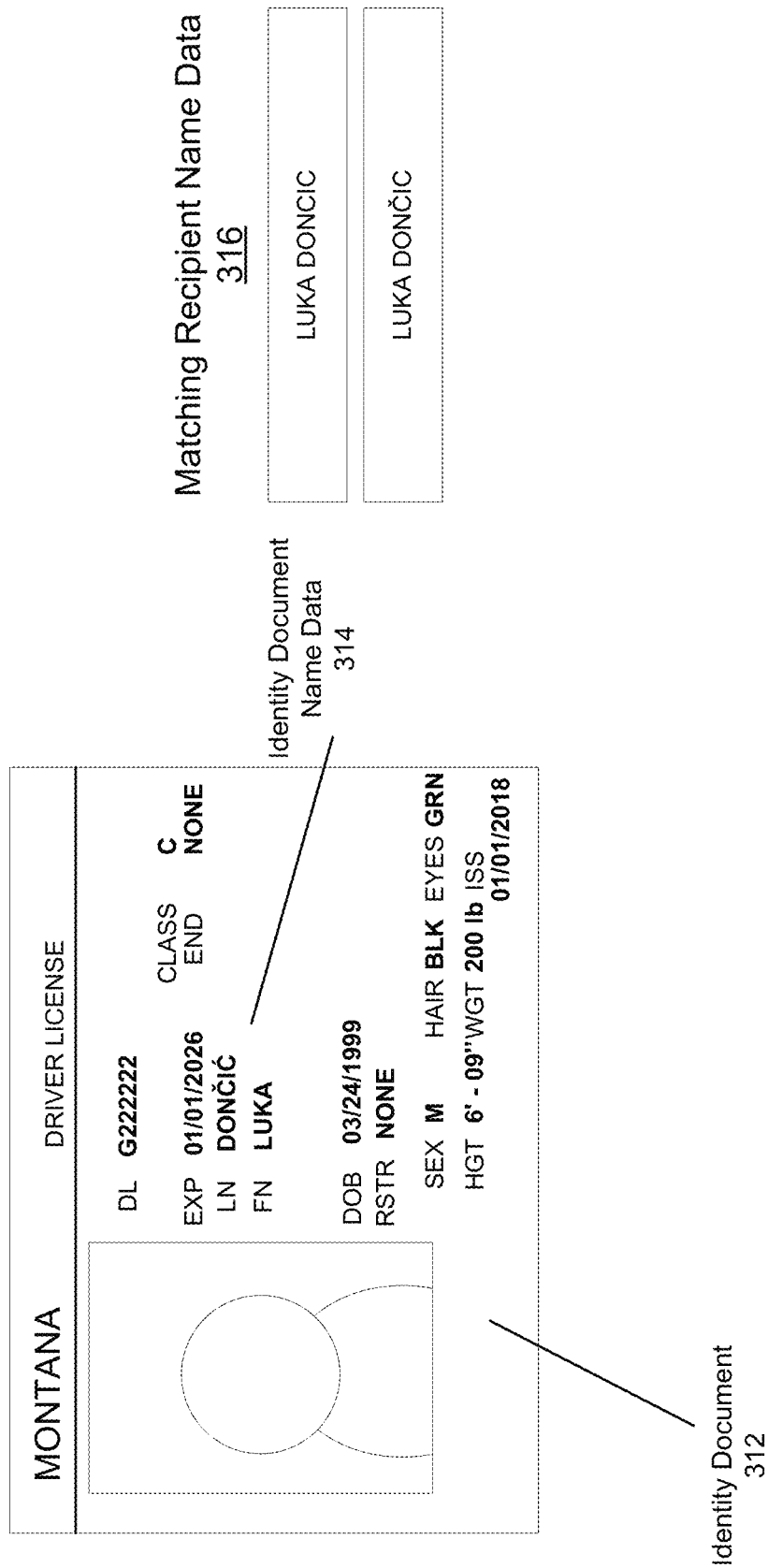
FIG. 3B depicts an example application of diacritics name matching rules to diacritic name features of identity document name data, according to one embodiment.

FIG. 3B depicts an example application of diacritics name matching rules 310 to diacritic name features of identity document name data 314. The diacritics name matching rules 310 describe constraints relating to how diacritics should or should not be considered for determining if identity source and recipient name data match. The diacritics name matching rules 310 may include various specific rules that result in identity document name data matching or not matching recipient name data based on diacritics name features.

In the example shown in FIG. 3B, the diacritics name matching rules 310 include a rule to "ignore diacritics" in comparing identity document name data to recipient name data. In this case, a letter represented with a diacritic is considered to be equivalent to the same letter represented without the diacritic. For instance, according to the "ignore diacritics" rule both "Č" and "Ċ" are equivalent to "C." As such, applying the "ignore diacritics" rule results to the name represented by the identity document name data 314 matching each name represented by matching recipient name data 316. In particular, the identity document name data 314 is included in an identity document 312 and includes a first name "LUKA" and a last name "DONČIĊ," where the last name includes diacritics "Č" and "Ċ." The matching recipient name data 316 includes names represented without the diacritics included in the last name of the data 314 but which still match the identity document name data 306 based on the diacritics name matching rules 310. In particular, the matching recipient name data 316 includes names represented without any diacritics (e.g., "LUKA DONCIC") and names represented with only some of the diacritics in the last name of data 314 (e.g., "LUKA DONČIC"). In other cases, the diacritics name matching rules may include additional or alternative rules. For example, the diacritics name matching rules 310 may ignore diacritics if the recipient name data does not include any diacritics (e.g., LUKA DONCIC) but require all diacritics to match if the recipient name data does include any diacritics. In this case, LUKA DONČIC would not be a matching recipient name because it is missing the diacritic "Ċ." In other examples the diacritics name matching rules may ignore certain diacritics and require others.

Figure 3C:
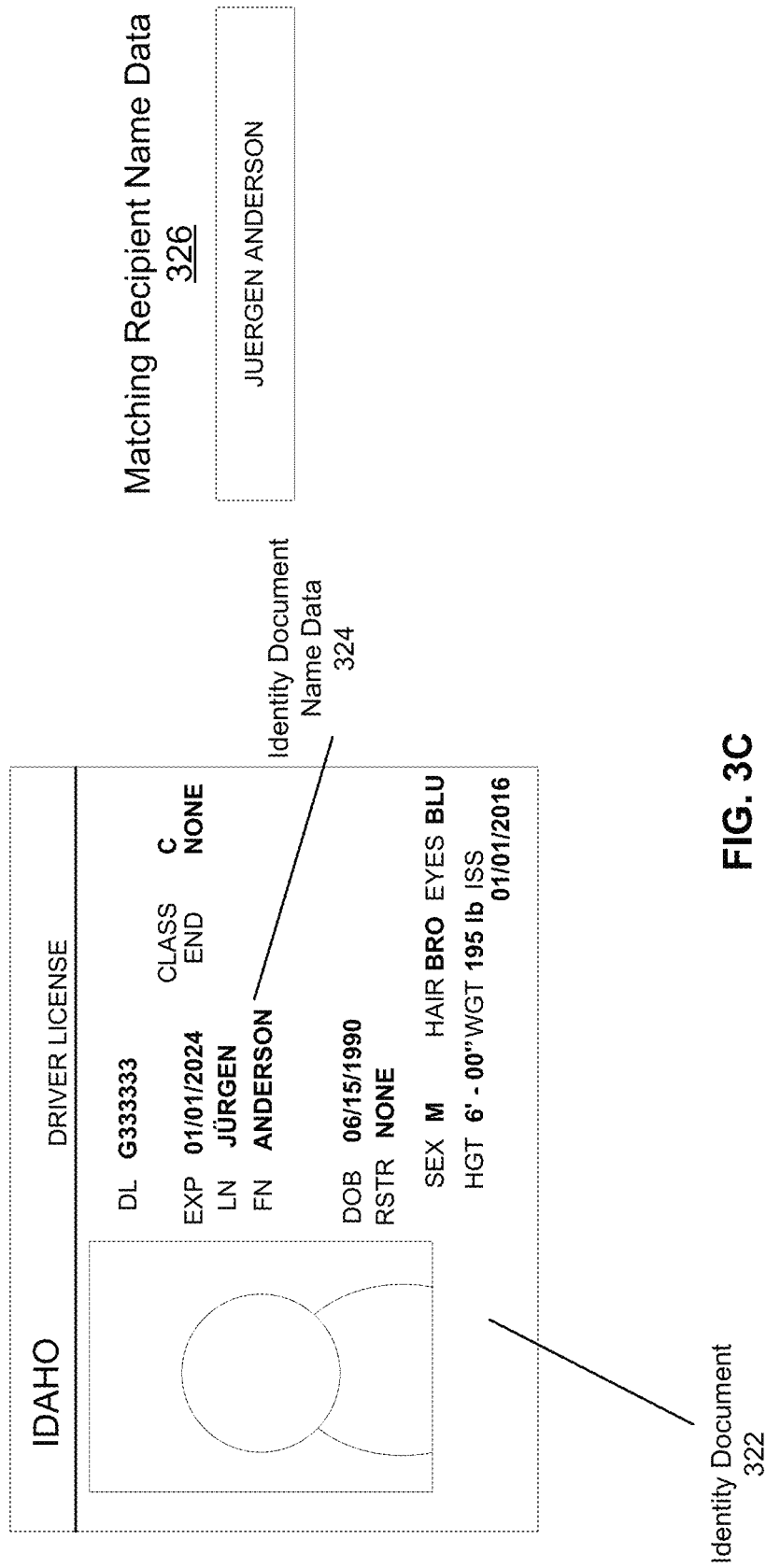
FIG. 3C depicts an example application of transliteration name matching rules to transliteration name features of identity document name data, according to one embodiment.

FIG. 3C depicts an example application of transliteration name matching rules 320 to transliteration name features of identity document name data 324. The transliteration name matching rules 320 describe constraints relating to how letters or symbols can be matched with equivalent transliterations for determining if identity source and recipient name data match. The transliteration name matching rules 320 may include various specific rules that result in identity document name data matching or not matching recipient name data. In some embodiments, a computer system applying the transliteration name matching rules 320 (e.g., the identity verification module 250) uses a dictionary mapping a letter or symbol to one or more equivalent transliterations corresponding to the letter or symbol, or vice versa. In this case, the dictionary may be configured by the centralized document system 110 or a recipient entity, or may be provided by a third-party service. In the same or different embodiments, the transliteration name matching rules 320 may be configured to accept some transliterations as equivalent and not others.

In the example scenario depicted by FIG. 3C, the identity document name data 324 is included in an identity document 322 and includes a first name "ANDERSON" and a last name "JÜRGEN," where the last name includes a diacritic "Ü." FIG. 3C further depicts matching recipient name data 316 that includes a name that does not include the diacritic "Ü," but which still matches the identity document name data 324 based on the transliteration name matching rules 320. In particular, the matching recipient name data 326 includes a name represented using a transliteration of the diacritic "Ü," "UE", which is equivalent to the diacritic "Ü" according to the transliteration name matching rules 320. Although a transliteration of a diacritic is exemplified in FIG. 3C, in the same or difference cases the transliteration name matching rules 320 may be applied to other forms of transliteration for various letters or symbols, such as from transliterations from letters of one alphabet to another (e.g., between letters from the Latin, Greek, Cyrillic, Armenian alphabets, etc.), one syllabary to another (e.g., between symbols from the Japanese, Cherokee, or Vai syllabaries, etc.), one set of symbols to another (e.g., Chinese characters to an alphabetic of syllable symbol equivalent), any combination thereof, or any other appropriate form of transliteration.

Figure 3D:
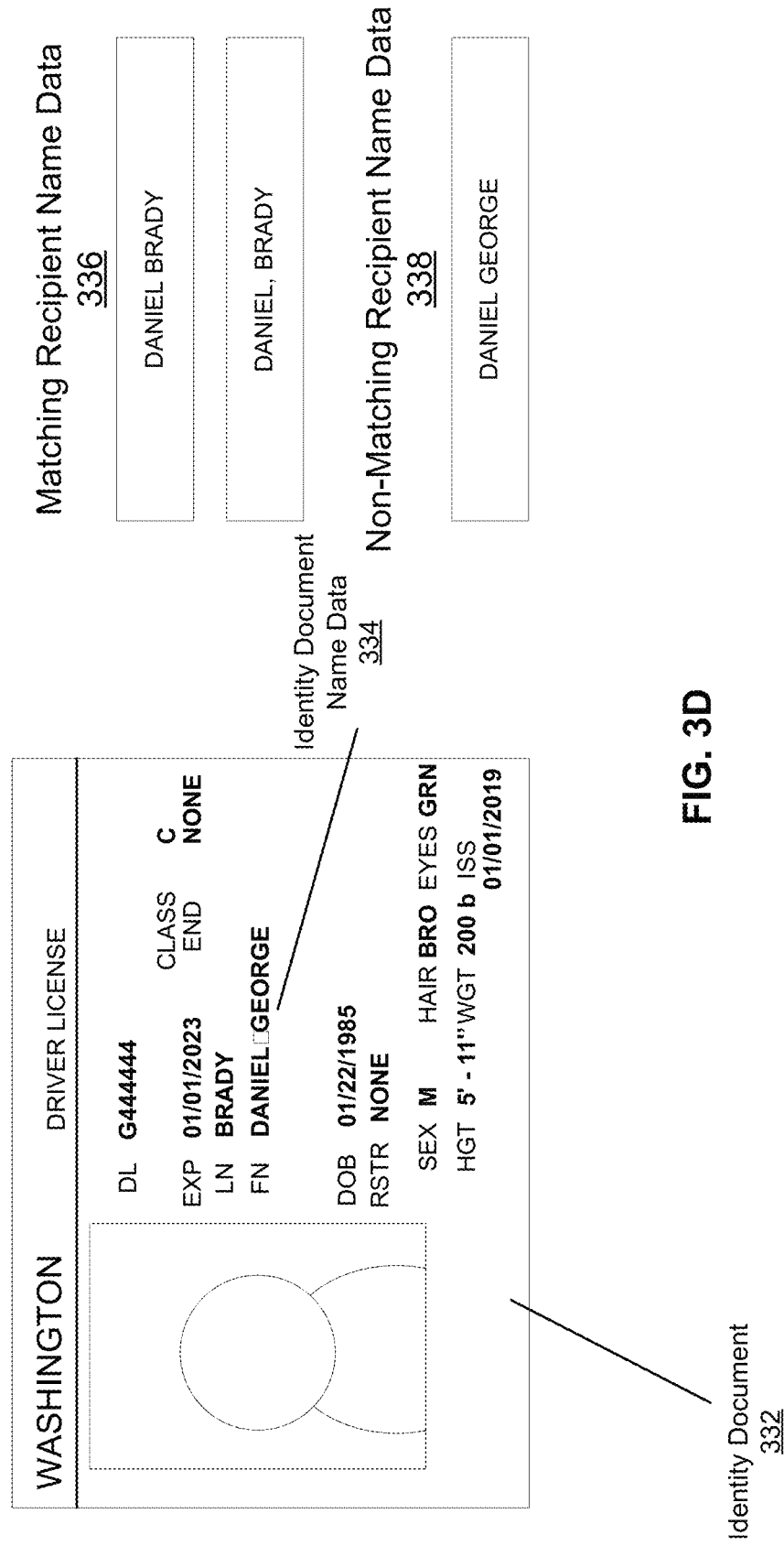
FIG. 3D depicts an example application of name type name matching rules to name type name features of identity document name data, according to one embodiment.

FIG. 3D depicts an example application of name type name matching rules 330 to name type name features of identity document name data 334. The name type name matching rules 330 describe constraints relating to how a number or type of matching names can be considered for determining if identity source and recipient name data match (e.g., a number of first names, last names, middle names, etc.). The name type name matching rules 330 may include various specific rules that result in identity document name data matching or not matching recipient name data based on name type name features. As an example, the name type name matching rules 330 may include one or more rules that require at least one matching first name, at least one matching last name, or both. In other cases, the name type name matching rules 330 may include additional or alternative rules.

In the example shown in FIG. 3D, the name type name matching rules 330 include one or more rules that require at least one matching first name and one matching last name. In particular, the identity document name data 334 is included in an identity document 332 and includes a first name "DANIEL," a middle name "GEORGE," and a last name "BRADY," where the first and middle name are separated by a comma. FIG. 3D further includes matching recipient name data 336 that includes names represented without a middle name but which still match the identity document name data 334 based on the name type name matching rules 330. In particular, the matching recipient name data 336 includes a name "DANIEL BRADY" including only the first and last names of the name data 334 and no comma, and includes a name "DANIEL, BRADY" also including only the first and last names of the name data 334 separated by a comma. FIG. 3D further depicts the non-matching recipient name data 338 which do not match the identity document name data 334 based on the first and last name matching rules 330. In particular, the non-matching recipient name data 338 includes the first and middle names from the name data 334, but not the last name from the name data 334.

FIG. 3E depicts an example application of special character name matching rules 340 to name type features of identity document name data 344. The special character name matching rules 340 describe constraints relating to how special characters should or should not be considered for determining if identity source and recipient name data match. Special characters are characters that do not impact the conceptual meaning of a name, such as various punctuation marks (e.g., periods or commas). Some punctuation marks, such as hyphens and apostrophes, may not be classified as special characters because they can impact the conceptual meaning of names, such as a hyphen being used to merge two names (typically referred to as a "double barreled name"). The special character name matching rules 340 may include various specific rules that result in identity document name data matching or not matching recipient name data based on special character name features. As an example, the special character matching rules 340 may include a rule "ignore special characters," such as in the example depicted in FIG. 3E. In other cases, the special character name matching rules 340 may include additional or alternative rules, such as only ignoring certain special characters or requiring others.

In the example scenario depicted by FIG. 3E, the special character matching rules 340 may include a rule to "ignore special characters" in comparing identity document name data to recipient name data. In particular, the identity document name data 344 is included in an identity document 342 and includes a first name "FRANK," a middle initial "J," and a last name "KURTZ," where the first name and middle initial are separated by a comma. FIG. 3E further includes matching recipient name data 346 that includes names represented without the same special characters as the identity document name data 334 but which still match the identity document name data 344 based on the special character name matching rules 340. In particular, the matching recipient name data 346 includes a name "FRANK J. KURTZ" including a period after the middle initial and a name "FRANK J KURTZ" that does not include any special characters. FIG. 3E further depicts the non-matching recipient name data 348 that do not match the identity document name data 344 based on the special character name matching rules 340. In particular, the non-matching recipient name data 348 includes a name having the first name from the name data 334 and another name beginning with the middle initial of the identity document name data 344, but not having the last name from the name data 344.

Figure 3F:
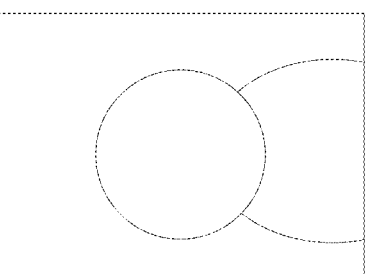
FIG. 3F depicts an example application of initial name matching rules to initial name features of identity document name data, according to one embodiment.
Figure 3F:

FIG. 3F depicts an example application of initial name matching rules 350 to initial name features of identity document name data 354. The initial name matching rules 350 describe constraints relating to how initials (i.e., individual letters representing a name) can be matched to full names for determining if identity source and recipient name data match. The initial name matching rules 350 may include various specific rules that result in identity document name data matching or not matching recipient name data based on initial name features.

In the example scenario depicted by FIG. 3F, the initial name matching rules 350 include one or more of the rules that "require a matching full last name and at least one matching full non-last name" (e.g., a first or middle name) in comparing identity document name to recipient name data. In particular, the identity document name data 354 is included in an identity document 352 and includes a first name "PETER," a middle name "ANDREW," and a last name "JOHNSON," where the identity document name data 354 does not include any initials. FIG. 3F further includes matching recipient name data 356 that includes names having one initial and two full names but which still match the identity document name data 354 based on the initial name matching rules 350. In particular, the matching recipient name data 356 includes a name "PETER A. JOHNSON" including a middle name initial and a name "P. ANDREW JOHNSON" including a first name initial. FIG. 3F further depicts non-matching recipient name data 358 representing names that do not match the identity document name data 354 based on the initial name matching rules 350. In particular, the non-matching recipient name data 358 includes various names that do not include satisfy the initial name matching rules 350. In other cases, the initial name matching rules 350 may include additional or alternative rules, such as only requiring a full last name.

Figure 3G:
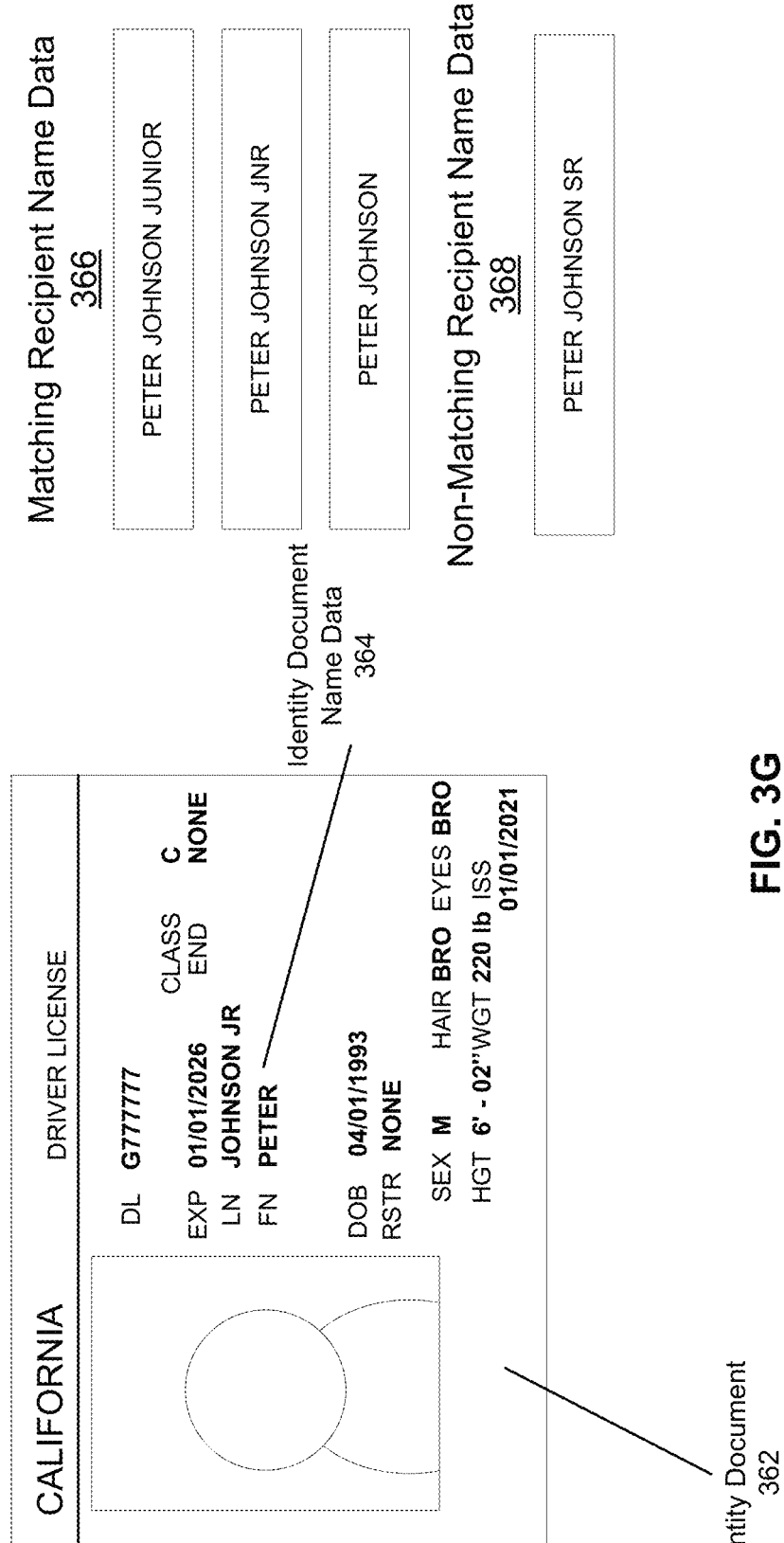
FIG. 3G depicts an example application of suffix name matching rules to suffix name features of identity document name data, according to one embodiment.

FIG. 3G depicts an example application of suffix name matching rules 360 to suffix name features of identity document name data 364. The suffix name matching rules 360 describe constraints relating to how suffixes can be considered for determining if identity source and recipient name data match. The suffix name matching rules 360 may include various specific rules that result in identity document name data matching or not matching recipient name data based on suffix name features. As an example, the suffix name matching rules 360 may include one or more of the rules to require an exact match for a suffix, to require one or more equivalent representations matching a suffix, to not permit conflicting suffixes, or to ignore suffixes altogether.

In the example scenario depicted by FIG. 3G, the suffix name matching rules 360 include one or more rules that do not permit conflicting suffixes in comparing identity document name data to recipient name data. In particular, the identity document name data 364 is included in an identity document 362 and includes a first name "PETER," a last name "JOHNSON," and a representation of the suffix "Junior" as "JR." FIG. 3G further includes matching recipient name data 366 that includes names having different representations of the suffix Junior or no suffix at all, but which match the identity document name data 364 based on the suffix name matching rules 360. FIG. 3G further depicts non-matching recipient name data 368 that do not match the identity document name data 364 based on the suffix name matching rules 360. In particular, the non-matching recipient name data 368 includes a name having a representation of the suffix "Senior" as "SR," which conflicts with the suffix Junior.

Validating Recipient Entity Identity Using Name Matching Rules

FIG. 4 is a flowchart illustrating an embodiment of a process 400 for validating an identity of a recipient entity using name matching rules. In the embodiment shown in FIG. 4, the process 400 is performed by the centralized document system 110. In other embodiments, some or all of the steps of the process 400 may be performed by other components of the system environment 100, or may be performed in a different order than that depicted in FIG. 4. Additionally, in other embodiments, the process 400 illustrated in FIG. 4 can include fewer, additional, or different steps than those described herein.

The process 400 includes the centralized document system 110 providing 410 an agreement to a client device for execution by a client device. For instance, the centralized document system 110 may provide a document package generated by the originating entity 130 using the originating user device 135 to the recipient user device 145 for executing by the recipient entity 140.

The process 400 includes the centralized document system 110 receiving 420 recipient name data representing an identity claimed by a user of the client device and having a first name feature. The recipient name data may be included in a document package including the agreement provided to the client device. Additionally, or alternatively, the recipient name data may be associated with a user account accessed by the client device (e.g., a user account the client device is logged in to). The first name feature may be various name features, such as one of the name features described above with reference to FIGS. 3A-G.

The process 400 includes the centralized document system 110 obtaining 430 information describing an identity document corresponding to the user, where the information includes identity source name data having a second name feature that differs from the first name feature. As an example, the information may be an image of the identity document or information extracted from an image of the identity document (e.g., using computer vision techniques). In this case, the image of the identity document may be captured using the recipient user device 145. As described above with reference to the identity data source 150, in other scenarios than that described in FIG. 4 the centralized document system 110 may alternatively (or additionally) receive identity source name data from other sources, such as a trusted service provider.

The process 400 includes the centralized document system 110 performing 440 a name matching operation on the first and second name features to determine whether the first name feature and second correspond to the same name. For instance, the centralized document system 110 may apply one or more of the name matching rules described above with reference to FIGS. 3A-G to the first feature and the second name feature to determine whether the identity source name data and the recipient name data match. In some embodiments, the centralized document system 110 performs the name matching operation after determining that the first and second name feature differ. In this case, if the centralized document system 110 instead determines that identity name data and the recipient name data do not have any differing name features (e.g., they are an exact match), the centralized document system 110 may forgo performing the name matching operation and instead verify the identity of the user based upon the lack of differing name features.

The process 400 includes the centralized document system 110 verifying 450, responsive to determining the first name feature and the second name feature correspond to the same name, the identity of the user. After verifying the identity of the user, the centralized document system 110 authorizes the user of the client device to execute the agreement. In other cases, the centralized document system 110 may authorize the user of the client device to perform one or more other actions, such as accessing, viewing, modifying, or otherwise interacting with a document package.

Alternatively, if the centralized document system 110 determines that the first name feature and the second name feature do not correspond to the same name, the centralized document system 110 rejects the identity verification attempt. For example, the first and second name features may be non-matching name features based on one or more name matching rules, as described above with reference to FIGS. 3A-3G. In this case, the centralized document system 110 may prevent the user of the client device from performing one or more actions, such as executing the agreement.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    generating, by a system, a document envelope that includes an agreement for execution by a user, wherein the document envelope specifies a name matching rule for authorizing the user to execute the agreement;
    receiving, by the system, recipient name data representing an identity claimed by the user, the recipient name data having a first name feature;
    obtaining, by the system, information describing an identity document corresponding to the user, the obtained information including identity source name data having a second name feature that differs from the first name feature;
    in response to the second name feature differing from the first name feature, determining, by the system, whether the second name feature is an allowed alternative representation of the first name feature that satisfies the name matching rule specified by the document envelope; and
    in response to determining that the second name feature is the allowed alternative representation of the first name feature, authorizing, by the system, the user to electronically sign the agreement.

2. The method of claim 1, wherein the name matching rule specified by the document envelope comprises one or more of: a case sensitivity matching rule, a diacritics name matching rule, a transliteration name matching rule, a name type name matching rule, a special character name matching rule, or a suffix name matching rule.

3. The method of claim 1, wherein the first name feature and the second name feature are transliteration name features, wherein the name matching rule specified by the document envelope comprises a transliteration name matching rule, and wherein determining whether the second name feature is the allowed alternative representation of the first name feature that satisfies the name matching rule specified by the document envelope comprises:
    accessing a dictionary mapping transliteration name features to one or more alternative transliteration name features; and
    determining that the dictionary maps the first name feature to the second name feature.

4. The method of claim 1, further comprising:
    receiving, by the system, additional recipient name data representing an additional identity claimed by an additional user, the additional recipient name data having a third name feature;
    obtaining, by the system, information describing an additional identity document corresponding to the additional user, the information describing the additional identity document including additional identity source name data having a fourth name feature that differs from the third name feature;
    in response to the fourth name feature differing from the third name feature, performing, by the system, a name matching operation on the third name feature and the fourth name feature to determine whether the third name feature and the fourth name feature correspond to an additional same name; and
    responsive to determining that the third name feature and the fourth name feature do not correspond to the additional same name, preventing, by the system, the additional user from electronically signing the agreement.

5. The method of claim 1, wherein the information describing the identity document is extracted from an image of the identity document captured by a client device associated with the user.

6. The method of claim 1, wherein the name matching rule specified by the document envelope comprises an initial name matching rule.

7. A method comprising:
    receiving, by a system, recipient name data representing an identity claimed by a user;
    obtaining, by the system, identity source name data associated with the user from an identity source, the identity source name data differing from the recipient name data;
    in response to the identity source name data differing from the recipient name data, determining, by the system, whether the identity source name data is an allowed alternative representation of the recipient name data that satisfies a name matching rule specified by a document envelope; and
    in response to determining that the identity source named data is the allowed alternative representation of the recipient name data, authorizing, by the system, the user to modify a document hosted by the system.

8. The method of claim 7, wherein the name matching rule specified by the document envelope comprises one or more of: a case sensitivity matching rule, a diacritics name matching rule, a transliteration name matching rule, a name type name matching rule, a special character name matching rule, an initial name matching rule, or a suffix name matching rule.

9. The method of claim 7, wherein obtaining the identity source name data comprises receiving the identity source name data from a trusted service provider.

10. The method of claim 7, wherein obtaining the identity source name data comprises receiving information describing an identity document including the identity source name data.

11. A system comprising one or more processors and non-transitory computer-readable storage media storing instructions that, when executed, cause the one or more processors to:
    generate a document envelope that includes an agreement for execution by a user, wherein the document envelope specifies a name matching rule for authorizing the user to execute the agreement;
    receive recipient name data representing an identity claimed by the user, the recipient name data having a first name feature;
    obtain information describing an identity document corresponding to the user, the obtained information including identity source name data having a second name feature that differs from the first name feature;

in response to the second name feature differing from the first name feature, determine whether the second name feature is an allowed alternative representation of the first name feature that satisfies the name matching rule specified by the document envelope; and in response to a determination that the second name feature is the allowed alternative representation of the first name feature authorize the user of the client device to electronically sign the agreement.

12. The system of claim 11, wherein the name matching rule specified by the document envelope comprises one or more of; a case sensitivity matching rule, a diacritics name matching rule, a transliteration name matching rule, a name type name matching rule, a special character name matching rule, an initial name matching rule, or a suffix name matching rule.

13. The system of claim 11, wherein the first name feature and the second name feature are transliteration name features, wherein the name matching rule specified by the document envelope comprises a transliteration name matching rule, and wherein the instructions to determine whether the second name feature is the allowed alternative representation of the first name feature that satisfies the name matching rule specified by the document envelope, cause the one or more processors to:

access a dictionary mapping transliteration name features to one or more alternative transliteration name features allowed by the transliteration name matching rule; and determine that the dictionary maps the first name feature to the second name feature.

\* \* \* \* \*